J. H. BARLEY.
Cane-Stripper.
No. 69,161.
Patented Sept. 24, 1867.
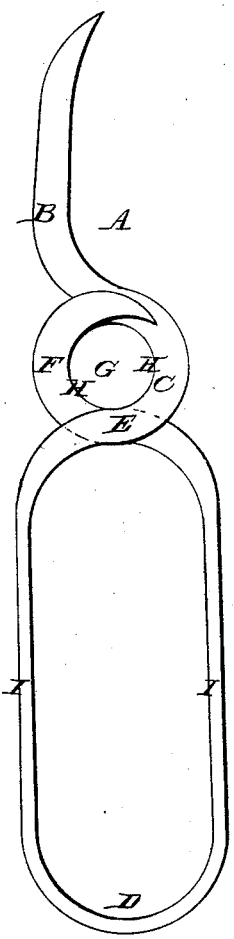

United States Patent Office.

J. H. BARLEY, OF SEDALIA, MISSOURI.

Letters Patent No. 69,161, dated September 24, 1867.

IMPROVEMENT IN CANE-STRIPPER.

The Schedule referred to in these Letters Patent and making part of the same.

TO ALL WHOM IT MAY CONCERN:

Be it known that I, J. H. BARLEY, of Sedalia, in the county of Pettis, and State of Missouri, have invented a new and useful Improvement in Cane-Strippers; and I do hereby declare that the following is a full, clear, and exact description thereof, which will enable others skilled in the art to make and use the same, reference being had to the accompanying drawings, forming part of this specification.

The present invention relates to an implement which is so constructed as to be susceptible for use in the "topping," "stripping," and "cutting off" of sorghum or sugar and other canes. In the accompanying plate of drawings my improved implement is illustrated, the figure being a side or face view of the same.

Similar letters of reference indicate corresponding parts.

A, in the drawings, represents my improved implement, to which B is a blade or knife, adapted for the cutting off of the tops of the sorghum or sugar and other cane. From this blade B the implement is continued, being bent around to form a curved jaw, and from thence into the bow D, back again under the jaw C, at the point E, terminating on another curved jaw, F, similar in shape to the jaw C, leaving an opening, G, between the two jaws C and F. The edges H of the jaws toward each other are sharpened so as to cut the cane if made to move or pass toward and by each other, while, if drawn over the cane from end to end, they will strip the same. The two side arms I to the bow-shaped portion D of the implement are so tempered as to have a spring or tendency to open from each other.

In the use of my improved implement upon sugar-cane, the top to the cane is first cut off by the blade B, when, placing the two jaws C and F over the cane, it is passed down the same and made to strip its side, until, the ground being reached, the jaws are brought together and the cane thus cut off or severed from its roots, and is ready for being ground.

I claim as new, and desire to secure by Letters Patent—

The implement A, consisting of blade B, and jaws C and F, constructed together, substantially as and for the purpose specified.

The above specification of my invention signed by me this     day of     , 1867.

J. H. BARLEY.

Witnesses:
J. F. TOBIAS,
T. K. BARLEY.